July 5, 1960     A. B. FREEMAN ET AL     2,943,968
METHOD OF MANUFACTURING FIBROUS MATERIAL SLAB
Filed Nov. 20, 1956     2 Sheets-Sheet 1
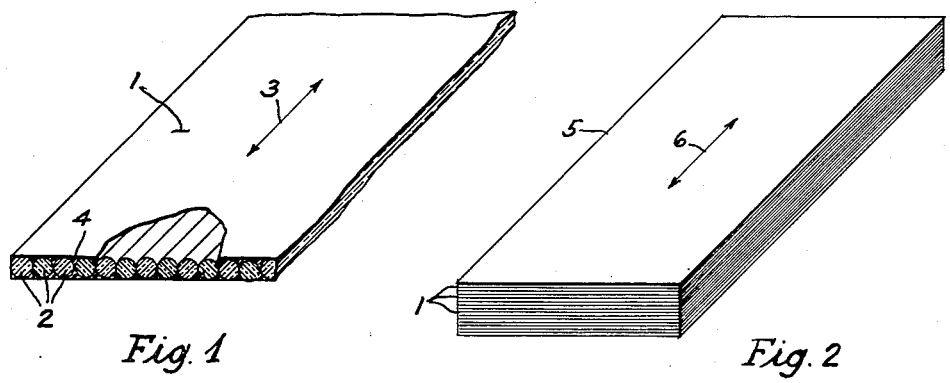
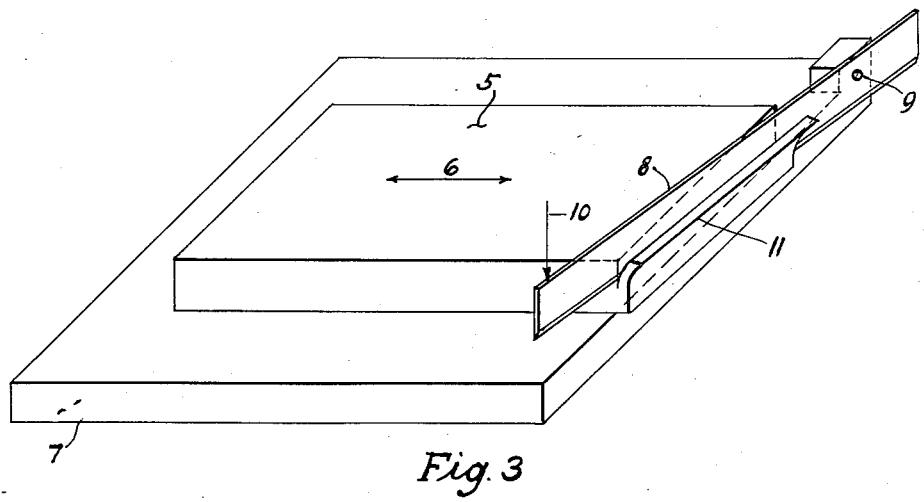
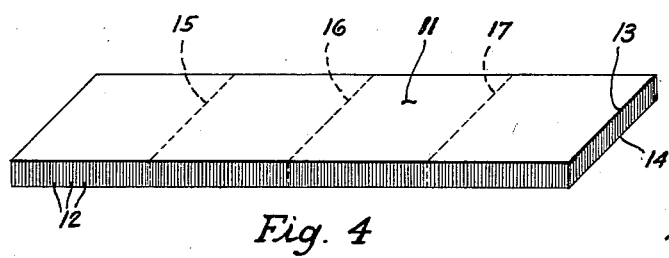
INVENTOR.
Arnold B. Freeman,
Bernard D. Raffel &
BY Roland A. Tripp
ATTORNEY

United States Patent Office 2,943,968
Patented July 5, 1960

2,943,968

METHOD OF MANUFACTURING FIBROUS MATERIAL SLAB

Arnold B. Freeman and Bernard D. Raffel, Akron, and Roland A. Tripp, Cuyahoga Falls, Ohio, assignors to Goodyear Aircraft Corporation, Akron, Ohio, a corporation of Delaware Filed Nov. 20, 1956, Ser. No. 623,422

1 Claim. (Cl. 154—90)

This invention relates generally to a method of manufacturing slabs of fibrous material, and, more particularly, to a method of manufacturing a modular slab having aligned parallel fibers.

In the manufacture of molded products, such as are described in our copending application Serial No. 623,421, filed November 20, 1956, a problem has arisen with regard to the utilization of modular slabs formed of parallel fibers in a plastic binder medium, with the fibers all aligned normal to the upper and lower slab faces. The difficulty of such slab manufacture will be readily apparent in that the slab thickness may range in the order of ⅛ inches to 3 inches, and, when the fibers are continuous in length, they too will be of the same magnitude. Since the ratio of binder to fiber content is generally very low in the desired slab, a basic difficulty presents itself in aligning and maintaining the alignment of the fibers, which are utilized in extremely large concentrations and are oriented normal to the slab faces. It is to the problem of forming these modular slabs that this invention is directed.

The general object of the invention is to provide a method of manufacturing modular slabs of fibrous material formed of parallel fibers in a plastic binder medium, with the fibers aligned normal to the upper and lower slab faces.

A further object of the invention is to provide a method of manufacturing the slabs of the invention which is simple, efficient, and economical in operation.

Other objects and advantages of this invention will become apparent hereinafter as the description proceeds; the novel features, arrangements, and combinations being clearly delineated in the specification, as well as in the appended claim.

In the drawings:

Fig. 1 is a fragmentary, enlarged, perspective view of a portion of a sheet having a single layer of aligned parallel fibers;

Fig. 2 is a perspective view of a stacked block of the sheets of Fig. 1;

Fig. 3 is a perspective view showing the cutting step of the method of the invention;

Fig. 4 is a perspective view of a slab resulting from the cutting operation depicted in Fig. 3;

Figure 5:
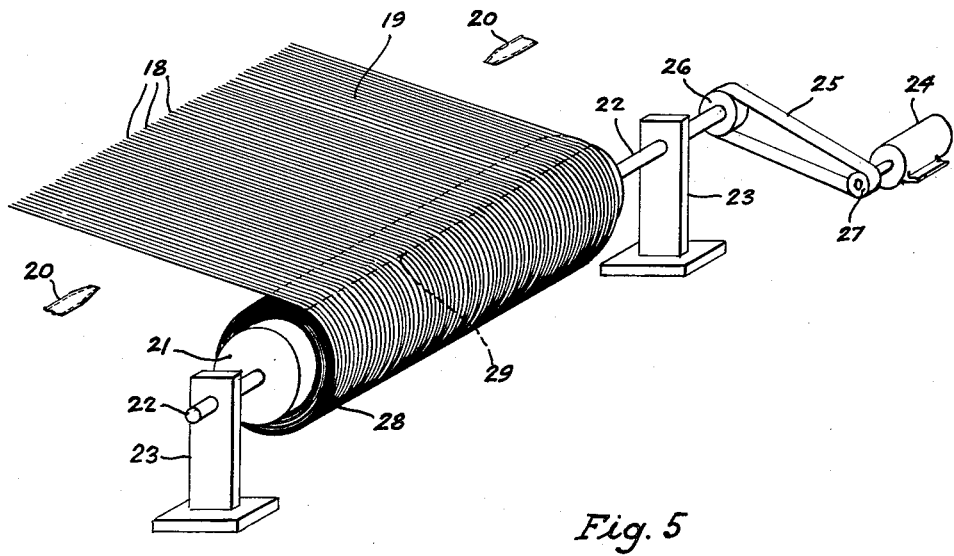
Fig. 5 is a diagrammatic perspective view of another method of forming a block such as is shown in Fig. 2.

Fig. 1 shows in highly enlarged scale, a sheet 1 formed of continuous parallel fiber-glass fibers 2 laid in the direction shown by the arrow 3. The fibers 2 are aligned in side-by-side relationship in a plastic binder medium formed of an uncured resin 4. The fibers 2 may be selected from any known fibrous materials depending on the qualities desired in the final product. For example, if heat resistance is desirable, one of the more heat resistant fibers such as glass, quartz, and the like may be used. Furthermore, the fibers may either be single strands as shown in Fig. 1 or groups of parallel strands such as is commonly referred to in the art as roving. It will be understood that the choice of materials is determined by the use of the final product and that therefore the method of the invention is not determinative of such material choice.

A multiplicity of the sheets 1 of Fig. 1 are stacked congruently as shown in Fig. 2, to form a block 5 having all the fibers of the respective sheets parallel respectively and aligned as shown by the arrow 6.

In Fig. 3, the block 5 is shown placed on a cutting platform 7. A knife 8 is shown diagrammatically as pivoted by a pin 9 to one corner of the platform 7. The block 5 is aligned so that the fiber direction (represented by the arrow 6) is normal to the knife 8, and is placed so that the desired thickness projects beyond the edge of the platform 7. A suitable force can then be applied in the direction of the arrow 10 to cause the knife 8 to cut a slice 11 from the end of the block 5. Such cutting may be accomplished in relatively easy manner as the block 5 is in a tacky and in an uncured state and therefore offers but slight resistance to the passage of the knife 8 therethrough. Where the slice cut is of exceedingly small thickness, it may be advisable to utilize a backing paper or board for each slice as it is cut, to facilitate handling and storing of cut slices.

Fig. 4 shows the slice 11 after severance from the block 5. The slice 11 is in the form of a slab having parallel fibers 12 aligned normal to the upper and lower slab faces, 13 and 14 respectively. If desired, further cuts can be made along the dotted lines 15, 16, and 17 to provide small modular slab sections. Any desired slab configuration may be produced by either cutting a block of the desired configuration, or else by successive cuts made on the slice 11. For example, if hexagonal modular slab sections are desired, the block 5 could be of hexagonal shape and thus when sliced will produce hexagonal slices. Or the slice 11 of Fig. 4 could be cut to form hexagonal modular sections.

It will be understood that the cutting apparatus of Fig. 3 is only diagrammatic in presentation; many conventional means for accomplishing this operation will be apparent to one skilled in the art.

Another method of forming a block similar to that of block 5 of Fig. 2 is shown diagrammatically in Fig. 5. Continuous glass fibers 18 are aligned in parallel manner to form a web 19. The glass fibers are taken from feed spools (not shown) in a conventional manner. After being sprayed with a plastic binder medium by the spray nozzles 20, which are connected to a conventional storage tank and supply pump (not shown), the web 19 is wound convolutely on a cylindrical mandrel 21. The mandrel 21 is suitably mounted by means of shafts 22 journaled in supports 23, and is driven by a motor 24 through a belt 25 and pulleys 26 and 27.

Figure 6:
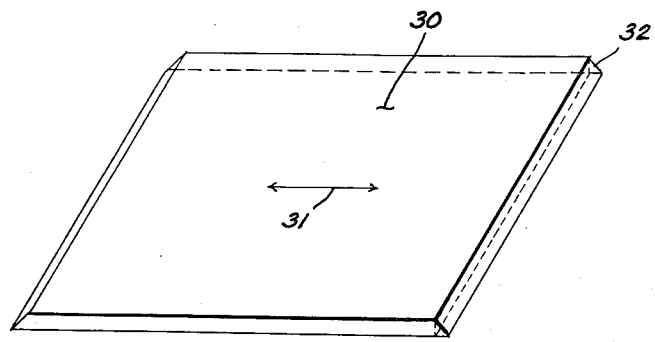
Fig. 6 is a perspective view of the block resulting from the use of the apparatus of Fig. 5.

After the desired thickness has been wound on the mandrel 21, the web 19 is severed and the tube 28 so formed is cut along the line 29, and spread out to form the block 30 shown in Fig. 6 wherein the fibers are aligned in the direction of the arrow 31. One edge portion 32 is then trimmed and the block processed in the same manner as shown in Fig. 3 to provide a multiplicity of modular slabs. The binding resin 4 may be either thermosetting or thermoplastic. The customary useful polymeric materials will range from viscous liquids to solids at room temperature. For example, silicone resins, epoxy resins, phenolic resins, polyester resins, including the alkyd resins, the halogenated ethylenes, polyamides, vinyl polymers and copolymers, and the various natural hard resins can be used in the practice of this invention.

The known silicone resins which are useful in the practice of this invention can be described as substituted compounds of silicon which normally contain silicon, oxygen and organic groups attached thereto. The silicone resins are polymeric materials having an organopolysiloxane molecular structure. These polymers are based on either a cross-linked or linear skeleton of alternate oxygen and silicon atoms. The attached organic groups may be alkyl or aryl.

The known epoxy resins which are useful in the practice of this invention can be described as the reaction products of polyphenolic compounds and epoxy compounds such as epichlorohydrin. Cross-linking with a catalyst forms the thermosetting polymers. Polymerization is normally induced by means of organic polyamines. Also, the epoxide resins can be copolymerized with various other types of resins such as urea formaldehyde, phenol formaldehyde and melamine formaldehyde. The epoxy resins may also be esterified with the various fatty acids and vegetable oil acids.

The known phenolic resins which are useful in the practice of this invention can be described as the reaction products of phenols and other reactive molecules. The more common phenolic resins are the phenol-aldehyde resins. The phenol may be any of the monohydric or polyhydric phenols such as phenol, cresol, eylenol, resorcinol, catechol, phlorogulcinol, etc. The phenol may be condensed with any resin-forming aldehyde to yield a thermosetting resinous condensation product. The useful aldehydes include furfural, acrolein formaldehyde, acetaldehyde, etc.

The known polyester resins which are useful in the practice of this invention can be described as the condensation products of polybasic acids and polyols such as the glycols, glycerols, etc. The polyesters may be used in conjunction with the polyisocyanates to form polyurethane resins. Alkyd resins can be further described as the condensation products of polyhydric alcohols and polycarboxylic acids. Representative polyhydric alcohols which can be used in preparing alkyd resins for use in the practice of this invention are ethylene glycol, triethylene glycol, propylene glycol, 1,4 butene diol, dipropylene glycol, hexamethylene glycol, pinacol and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric, 2-phenylglutaric, citric, citraconic, mesaconic, itaconic, oxalic, malonic, glutaric, pimelic, suberic, azelaic and sebacic acids. It is possible to substitute ester-forming derivatives, such as the anhydrides, the simple esters and the like for the acids themselves. Also certain monofunctional modifiers can be incorporated in the resin according to the known art.

The known halogenated ethylenes which are useful in the practice of this invention can be described as polymerization products of chlorotrifluoroethylene or tetrafluoroethylene. The polymerization is normally conducted at moderately high pressures and in the presence of a catalyst.

The known vinyl polymers and copolymers useful in the practice of this invention include the polyvinyl chlorides, polyvinyl acetates, polyvinyl chloride-acetate copolymers, and polyvinylidene chlorides.

The known polyamide resins useful in the practice of this invention can be described as reaction products of dibasic acids and organic diamines.

Thus, by the method of the invention described, a fibrous slab is formed having parallel fibers aligned normal to the upper and lower faces thereof. As previously described, the slab is in an uncured state, and therefore is a desirable and adaptable modular unit or "building-block" for the manufacture of many articles wherein such fiber orientation is necessary in the final product.

The terms "upper and lower faces" of the slab as used herein will be understood to designate the large flat areas of the slab, and are not intended to encompass the smaller side areas or edges of the slab.

While certain representative embodiments and details have been shown for the purpose of illustrating the invention, it will be apparent to those skilled in this art that various changes and modifications may be made therein without departing from the spirit or scope of the invention.

We claim:

The method of making slabs formed of parallel fibers in a plastic binder medium which includes the steps of positioning a plurality of continuous parallel fibers in a single plane to form a layer having a thickness about equal to the diameter of a fiber, impregnating the fibers in the layer with a tacky, uncured plastic binder, superimposing a plurality of the tacky layers with the fibers parallel to each other to form a block, the fibers being parallel to the top, the bottom and the longitudinal sides of the block, and being perpendicular to the ends of the block, cutting slabs in turn from the end of the block, the cut surfaces of the slabs being perpendicular to the fibers, and with the distance between the cut surfaces being the shortest dimension of each slab, and arranging the slabs so that the edges containing the exposed parallel sides of the fibers contact each other.

References Cited in the file of this patent

UNITED STATES PATENTS

| | | |
|---|---|---|
| 1,942,662 | Rosenblatt | Jan. 9, 1934 |
| 2,057,731 | Munroe et al. | Oct. 20, 1936 |
| 2,160,001 | Saborsky | May 30, 1939 |
| 2,311,704 | Simison | Feb. 23, 1943 |
| 2,373,500 | Pearce | Apr. 10, 1945 |
| 2,594,693 | Smith | Apr. 29, 1952 |
| 2,758,951 | Case | Aug. 14, 1956 |
| 2,782,465 | Palmer | Feb. 26, 1957 |